July 15, 1924.

H. KOCH

WINDING MACHINE

Filed June 28, 1922    3 Sheets-Sheet 1

1,501,670

INVENTOR
HENRY KOCH
BY his ATTORNEYS

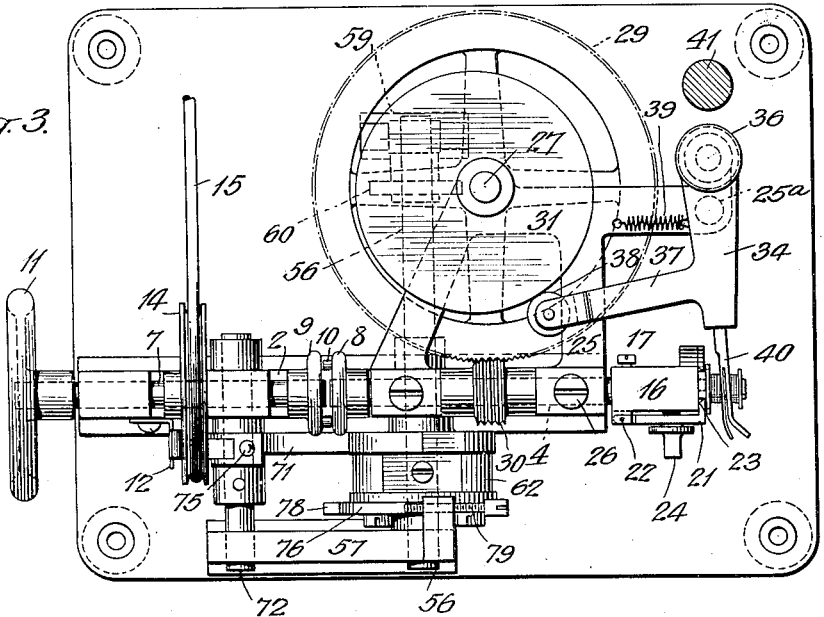

July 15, 1924.  
H. KOCH  
WINDING MACHINE  
Filed June 28, 1922  
1,501,670  
3 Sheets-Sheet 3
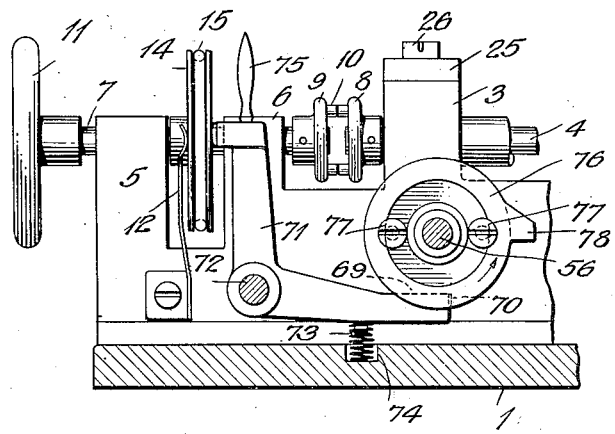
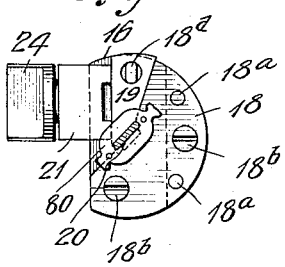
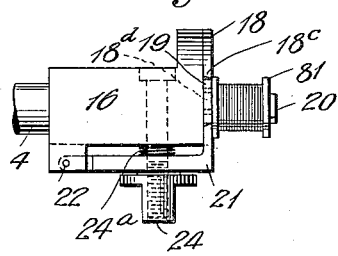
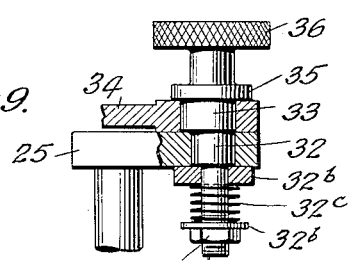
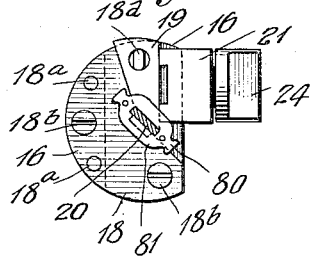
INVENTOR  
HENRY KOCH  
BY *Stockbridge & Borst*  
ATTORNEYS.

Patented July 15, 1924.

1,501,670

UNITED STATES PATENT OFFICE.

HENRY KOCH, OF JAMAICA, NEW YORK, ASSIGNOR TO DICTOGRAPH PRODUCTS CORPORATION, A CORPORATION OF VIRGINIA.

WINDING MACHINE.

Application filed June 28, 1922. Serial No. 571,508.

*To all whom it may concern:*

Be it known that I, HENRY KOCH, a citizen of the United States, residing at Jamaica, in the county of Queens and State of New York, have invented certain new and useful Improvements in Winding Machines, of which the following is a full, clear, and exact description.

This invention relates to winding machines, such as may be utilized in winding electrical conductors upon pole pieces or cores to form electromagnets. When the wire or conductor utilized is extremely small in diameter, such as used for example, in the winding of electromagnets of high resistance for radio telephone and telegraph receivers, it is difficult to guide the tread-wire upon the spool, core or frame so as to form uniform layers and to prevent breakage of the wire.

An object of the invention is to provide an improved winding machine with which electromagnets may be wound of extremely fine wire in uniform layers; with which breakage of the wire is reduced to a minimum; with which the wire wound upon the core of pole piece may be measured comparatively accurately; with which the winding operation may be checked after the desired length of wire has been wound upon the pole piece or core; with which the end starting point of the layers may be varied to correspond with variations in the lengths of coils; which may be utilized to wind electromagnets of different lengths; and which is efficient, rapid, durable and inexpensive. Other objects and advantages will be apparent from the following description of an embodiment of the invention, and the novel features will be particularly pointed out in claims.

In the accompanying drawing:

Fig. 3 is a sectional plan of the same;

Fig. 4 is a sectional elevation of a portion of the same;

Fig. 5 is a perspective of one of the cores, pole pieces, or frames upon which the wire is to be wound;

Fig. 6 is a sectional elevation of another portion of the machine;

Fig. 7 is an end elevation of the clutch for holding the pole piece or core upon which the wire is to be wound.

Fig. 8 is a side elevation of the same;

Fig. 9 is a fragmentary sectional elevation of a portion of the machine;

Fig. 10 is a sectional elevation through the pole piece, core or frame when held in the clutch; and Fig. 11 is an end view of the clutch with the pole piece or core removed.

Figure 1:
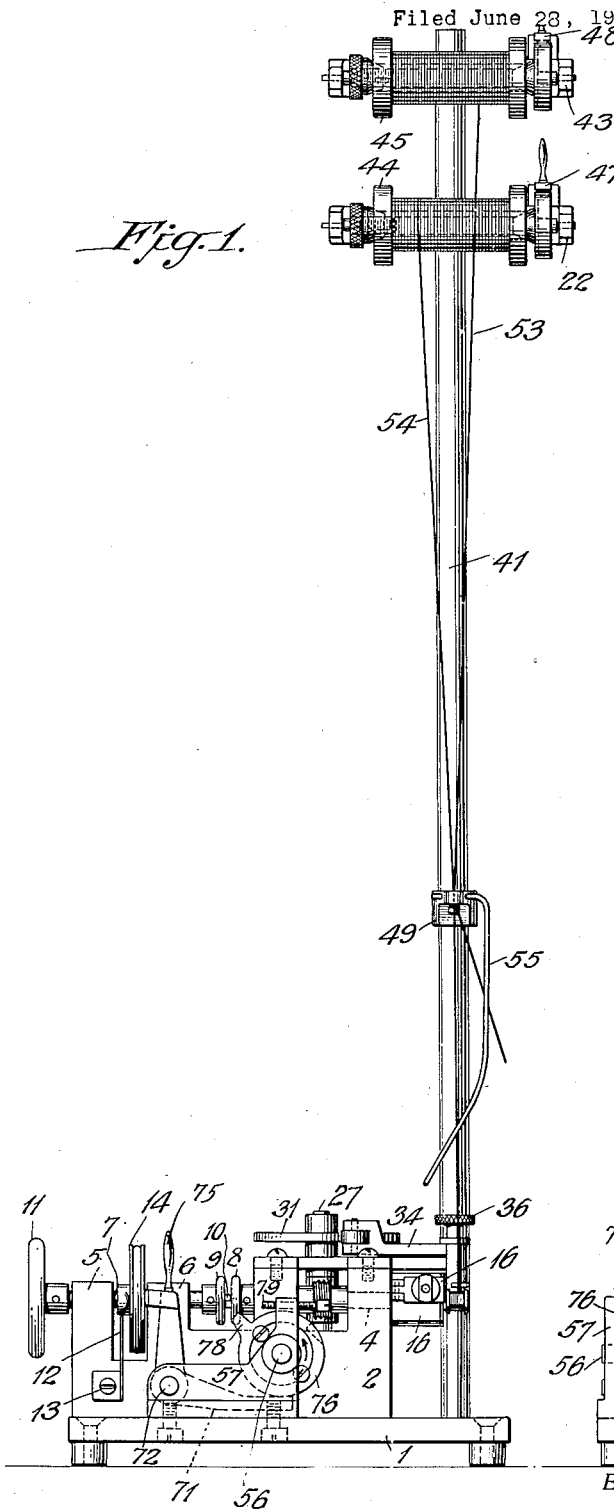
Fig. 1 is a front elevation of a winding machine constructed in accordance with the invention.

In the illustrated embodiment of the invention, a base plate 1 is provided with uprights 2 and 3, which rotatably support a winding spindle 4 in a horizontal position with the ends projecting beyond the bearings in the uprights. The base 1 is also provided with spaced uprights 5 and 6 which rotatably support a driving spindle 7 in endwise alignment with the winding spindle 4. The abutting ends of the spindles 4 and 7 are provided with coupling plates 8 and 9 carrying pins 10 projecting endwise therefrom and toward one another, the pins cooperating with one another to cause rotation together of the shafts when the pins are within the paths of rotation of one another. The driving spindle 7 is also slidable endwise in the bearing uprights 5 and 6, so as to carry the coupling plate 9 with its pins 10 into and out of coupling relation with respect to the coupling plate 8 and its pins 10. A hand wheel 11 upon the outer end of the driving spindle 7 serves as an operating member which may be grasped and manually rotated to cause a corresponding rotation of the winding spindle 4 in starting the winding operation.

A leaf spring 12 secured in a suitable manner, such as by screw 13, to one of the upright bearings 5, is adapted to press against one face of a driving pulley 14 fixed upon the shaft 7 between the bearing uprights 5 and 6. The spring 12 serves to press the driving pulley, and through it the driving spindle, toward and into coupling relation with the winding spindle 4. The driving pulley 14 is driven by a belt 15 from a suitable source of power, such as an electric motor (not shown), which is in turn controlled by a suitable foot-operated switch (not shown). The outer end of the winding spindle 4 is provided with a clutch 16 which is fixed therein in a suitable manner for rotation therewith, such as by a set screw 17 threaded through the clutch and engaging with the spindle. The clutch is provided upon its end face with a plate 18 held in position thereon by dowel pins 18$^a$ projecting from the end face of the clutch, which pins may enter apertures in the plate. Screws 18$^b$ pass through the plate 18 into the clutch body 16 to secure the plate thereto. The plate 18 has an undercut edge 18$^c$ against which an edge of the supporting arm 19 of an electromagnet frame or core may be disposed in abutting relation therewith so as to support the pole piece end 20 thereof, upon which the wire is to be wound, in a position to extend axially of the winding spindle. A pin 18$^d$ projecting from the end face of the clutch body 16 may be provided to enter an aperture in the supporting arm 19 and assist in holding the arm in position upon the clutch. An arm 21 is hinged at 22 to the base of the clutch 16 and is provided with an angular end 23 which is adapted to move across the end face of the clutch and by an undercut edge clamp the arm 19 of the core or frame of the electromagnet within the depression or recess and against the aligning edge 18 of the clutch. A screw 24 passes loosely through the arm 21 and threads into the base of the clutch 16 so as to adjustably press the arm 21 towards the base of the clutch and firmly clamp the frame of the electromagnet against the aligning edge 18. A spring 24$^a$ acting between the clutch 16 and the arm serves to yieldingly pass the arm in a direction to release the electromagnet frame.

A frame 25 is secured upon the upper ends of the bearing uprights 2 and 3 by screws 26 and upon a rod 25$^a$ projecting from the base, and rotatably mounts a vertically extending shaft 27, the lower end of the vertically extending shaft 27 extending into a bearing block 28 which forms both a rotating and end thrust bearing for the shaft. A worm gear 29 is fixed upon the shaft 27 between the bearings in frame 25 and block 28 and meshes with a worm screw 30 which is fixed upon the winding spindle 4 between the bearing uprights 2 and 3. Thus as the winding spindle rotates, a concomitant but proportionate reduced movement will be imparted to the shaft 27. An eccentric cam 31 is removably fixed upon the upper end of the shaft 27. An adjusting pin or spindle 32 is rotatably mounted in an extension of the bracket frame 25 at one side of the cam 31 and is provided with an eccentric hub or bearing portion 33 above the bracket frame 25. Upon this eccentric hub 33 a guide member or arm 34 is rotatably mounted. The member 34 is held upon the hub 33 and against the bracket frame 25 by a flange 35 upon the spindle or pin 32. The end of the pin 32 which projects through the frame 25 is threaded and carries thereon an adjustable nut 32$^a$, two washers 32$^b$, and a helical spring 32$^c$, the spring being disposed between the washers. Adjustment of the nut varies the frictional resistance to rotation of the pin 32 in its bearing. The frictional resistance holds the pin yieldingly in any adjusted rotary position. A knurled head 36 upon the pin or spindle 32 serves as a medium by which it may be rotated to shift the eccentric hub through a limited extent and thereby shift the axis of rotation of the guide member thereon.

The guide member is provided with an arm 37 extending towards the cam and carrying a roller 38 which has rolling contact with the periphery of the cam 31. A spring 39 is attached at one end of the guide member or arm 34 and at its other end to a pin upon the bracket frame 25 so as to yieldingly press the guide member or arm toward the cam and hold the roller 38 in contact with the periphery of the cam. The guide member or arm is also provided with a forked extension 40 forming a guide device extending directly above the bobbin portion of the core or pole piece of the electromagnet being wound and through which the wire is fed or guided upon the core or pole piece portion of the electromagnet. As the winding spindle 4 rotates, the cam 31 will, through the shaft 27, worm wheel 21 and worm screw 30, be slowly rotated and this rotation of the eccentric cam will cause an oscillation of the arm 34 above the pole piece or core of the electromagnet which is being wound. The oscillation of the guide device formed by the forked end of the guide member or arm 34 serves to feed or guide the wire to the pole piece of the electromagnet alternately from end to end thereof so as to form uniform layers of wire thereon, the throw of the cam 31 being sufficient to cause the guide member to travel alternately between the ends of the bobbin portion of the electromagnet frame being wound.

A rod 41 extends vertically from the base plate 1 and carries upon its upper end supporting frames 42 and 43 for spools 44 and 45 of the wire to be wound upon the frames of the electromagnets. The supporting frames 42 and 43 are adjustable along the rod 41 and may be clamped in adjusted positions in any suitable manner, such as by set screws 46. Suitable brake devices 47 and 48 are provided upon the supporting devices 42 and 43 for frictionally retarding the rotation of the spools 44 and 45. An arm 49 is adjustably carried by an intermediate portion of the rod 41 between the spools and the base plate 1, being held in adjusted positions by a set screw 50 carried thereby and adapted to be engaged with the rod 41. The arm 49 is provided with apertures 51 and 52 through which wires 53 and 54 from the spools may pass, the apertures 51 and 52 serving as guides for the wire. But one wire at a time is used and this wire after leaving the guide arm 49 passes through the forked extension of guide device 40 of the guide member or arm 34. A wire guard arm 55 depends from the arm 49 in front of the wires 53 and 54 so as to prevent accidental contact with the wire in use while the operator is preparing the other wire for use.

A shaft 56 is rotatably mounted in a horizontal position in bearing blocks 57, 58 and 59 carried by the base plate 1, the shaft extending at right angles to the winding spindle and to the shaft 27. A small worm wheel 60 is fixed upon the shoulder 56 and meshes with a worm screw 61 which is fixed upon the shaft 27 below the worm wheel 29. The shaft 56 will, therefore, be driven concomitantly with and at a reduced ratio to that of the shaft 27 and the winding spindle 4. A measuring cam member 62 is rotatably carried by the shaft 56 between the bearing blocks 57 and 58 and may be held against endwise movement thereon by means of a screw 63 which has threaded engagement with the measuring cam and extends into an annular groove 64 in the shaft 56. The measuring cam member 62 is also provided with radially extending recesses 65 which are filled at the outer ends by short screws 66. Small plugs 67 are reciprocatingly disposed in the inner ends of the recesses 65 and springs 68 are compressed between the screws 66 and the plugs 67 so as to force the plugs 67 against the shaft 56 and frictionally lock the measuring cam to the shaft. The measuring cam will, therefore, normally rotate with the shaft 56 and at the same time it can be adjusted angularly about the shaft 56 by applying a rotary force thereto sufficient to overcome the friction between the plugs 67 and the shaft. By adjusting the screws 66 the pressure of the springs and thereby the friction resisting and rotation of the cam upon the shaft can be varied. The measuring cam is provided in its periphery with a trip notch 69 having its bottom wall extending in the direction of a chord of the periphery of the cam, and having also a shouldered side wall 70 at right angles thereto forming a drop-off shoulder.

A bell crank lever 71 is pivoted at 72 to the upright bearing block 6 and one of the arms thereof extends adjacent to and tengentially of the periphery of the measuring cam. The other arm of the lever 71 extends adjacent to and along the face of the driving pulley 14 which is opposite to the face engaged by the spring 12 so that when the lever 71 is rotated towards the driving pulley, the pulley and driving shaft will be shifted against the action of the spring 12 to uncouple the driving and winding spindles. A spring 73 disposed in a recess 74 of the base plate 1 acts upon the lever 71 to constantly stress the lever in a direction to cause an uncoupling of the spindles, and has a strength sufficient to overcome the resistance of the spring 12 as well as uncouple the spindles. As the measuring cam is rotated in the direction of the arrow (Fig. 6) the arm of the lever 71 in contact with the cam will be released when the shoulder 70 of the trip notch of the cam passes the end of the same, whereupon the spring 73 will cause a rotation of the lever 71 in a direction to cause an uncoupling of the spindles. This uncoupling stops the operating of the winding spindle and also of the measuring cam.

When the winding operation is started, the measuring cam is rotated upon the shaft 56 in a direction opposite to that shown by the arrow, (Fig. 6) so as to position the shoulder 70 at a distance from the end of the lever 71 such that a desired number of rotations of the winding spindle will occur before the shoulder 70 moves beyond the end of the lever 71 and releases the latter for rotation to uncouple the spindles. The lever 71 is provided with an operating handle 75 by which the lever 71 may be rotated against the action of the spring 73 to move the lever out of the notch in the measuring cam and permit rotation of the cam to a new starting position. When the notch in the measuring cam is away from the position shown in Fig. 6, the arm of the lever 71 will ride upon the periphery of the cam and will be held in a position away from the driving pulley 14, so as to permit the spring 12 to shift the pulley and driving spindle into coupling relation with the winding spindle.

A ring 76 is rotatably clamped upon a shoulder provided upon the outer end face of the measuring cam by means of screws 77 which are threaded into the end face of the measuring cam with the heads of the screws overlapping the inner circumference of the ring. When the screws 77 are tightened, the ring will be clamped securely to the measuring cam for rotation therewith. When the screws are loosened, the ring may be adjusted angularly about the measuring cam and clamped in any angular position by tightening the screws 77. The ring is provided with a peripherally extending lug 78 which is adapted to contact with the end of a screw 79 adjustably threaded through an extension of the upright bearing block 57. The engagement of the lug 78 against the end of the screw 79 serves to limit the rotation of the measuring cam in a setting direction for the start of the winding operation. By adjusting the ring angularly with respect to the cam, the position of the notch of the cam at the starting position determined by the lug 78 and screw 79 may be varied. When the same size and type of electromagnets are being wound, and when the same number of rotations are to be given to the winding spindle at each winding operation, no adjustment of the ring 76 relatively to the measuring cam will be necessary except for the initial setting for that size and type of electromagnet.

Figure 2:
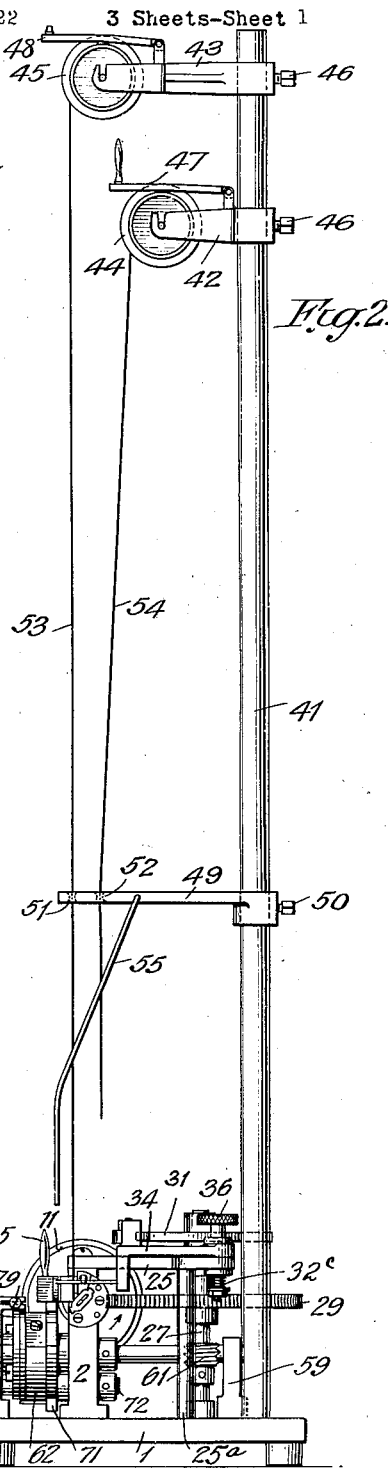
Fig. 2 is a side elevation of the same.

In the operation of the winding device, a cam 31 having a throw properly proportional to the length of the pole piece or core to be wound is placed upon the upper end of the shaft 27 and fixed thereon in a suitable manner, such as by a set screw. The frame or core 19 is then clamped in the clutch 16 with the pole piece, or core portion, to be wound extending axially of the winding spindle, as shown in Figs. 2, 3 and 8. One of the wires 53 or 54 is threaded through the guide device 40 and secured to an ear 80 of one of the flanges 81 forming the winding limits of the coil. The ring 76 is adjusted angularly upon the measuring cam to position the lug 78 at an angular distance from the notch in the measuring cam such that when the lug 78 and cam have been shifted about the shaft 56 until limited by the screw 79 and the machine has been placed in operation, the notch in the measuring cam will, during the winding operation, be brought into a position to release the lever 71 after a desired number of revolutions of the winding spindle have occurred.

The ring 76, after being clamped to the measuring cam, is rotated to bring the lug 78 against the screw 79, the lever 71, of course, being first shifted away from the driving pulley to release the measuring cam for rotation. This movement of the lever 71 will also release the driving pulley and spindle and the spring 12 will thereupon shift the spindle into coupling relation with the winding spindle. The head 36 of the spindle or pin 32 is then adjusted rotatably to rotate its eccentric portion 33 and thereby shift the guide member or arm 34 about the point of contact between the roller 38 and the cam 31 as an axis until the portion of the guide device through which the wire 53 or 54 passes is brought to one limit or the other of the layers of wire between the flanges 81 upon the pole piece or core when the guide member is at one limit of its travel caused by the cam 31. The source of power driving the pulley 14 is then rendered active and the winding spindle will be rotated. At the same time the cam 31 will be rotated to shift the guide device from end to end of the core or pole piece being wound, that is between the flanges 81 thereof, and feed the wire thereto in uniform layers.

During the rotation of the winding spindle, the measuring cam will also be rotated proportionately thereto until the arm of the lever 71 drops off the shoulder 70 into the notch 69 in the measuring cam, whereupon the lever 71 will be operated by the spring 73 to shift the driving spindle out of its coupled relation to the winding spindle and thereby stop further operation of the winding spindle. The wire is then severed adjacent to the core or frame and suitably secured to one of the flanges 81 of the pole piece or core so as to prevent unwinding therefrom and provide a coil circuit lead. The wound electromagnet is then removed from the clutch 16 and a new frame 19 is placed therein. The lever 71 is shifted to release the measuring cam and this cam is then rotated until limited by the engagement of the lug 78 with the screw 79. The wire from one of the spools is then passed through the guide device 40 and secured to the ear 80 of the flange 81 of the pole piece or core 20, after which the machine is started as before. These operations are continued with the winding of each succeeding electromagnet. When electromagnets of a different length are to be wound, a new cam 31 having a throw proportional to the length of the new frame or core to be wound will replace the cam 31 then upon the spindle and suitable corresponding adjustments of the spindle or pin 32 and the measuring cam ring 76 will be made as before.

By reason of the considerable distance between the spools 44 and 45 and the winding spindle, there will be sufficient slack in the wire to avoid breakage due to the unequal pulls or jerks upon the wire while being wound upon the rectangular pole piece or core of the electromagnet.

It will be obvious that various changes in the details and arrangement of parts herein described and illustrated for the purpose of explaining the nature of the invention may be made by those skilled in the art within the principle and scope of the invention.

I claim:

1. In a winding machine, a rotatable winding spindle, a clutch carried by one end of the spindle for removably mounting an electromagnet frame to be wound, means for driving said spindle, a cam, means for driving said cam concomitantly with said spindle, a rotatable pin having an eccentric cam portion, an arm rotatable on said eccentric cam portion and contacting with the cam surface of the cam, a spring device pressing the arm into contact with the cam, and a guide device carried by the arm for feeding the wire to the frame, the arm being shifted back and forth by the cam and spring to form uniform layers of wire upon the frame, the rotation of the pin and its eccentric cam portion serving to shift the arm about its point of contact with the cam to vary the position of the guide device and thereby vary the starting point of the layers upon the frame.

2. In a winding machine, a rotatable winding spindle, means for driving said spindle, means on said spindle for removably mounting an electromagnet frame to be wound, a worm on said spindle, a cam shaft, a worm wheel carried by the shaft and meshing with said worm to be driven thereby, a cam carried by said shaft, means controlled by the cam for feeding the wire to the frame and shifting it endwise of the frame to form layers thereon, and means for causing a variation in the starting point of the layers on the frame without changing the position of the frame on the spindle.

3. In a winding machine, a rotatable winding spindle, means for driving said spindle, means on said spindle for removably mounting an electromagnet frame to be wound, a worm on said spindle, a cam shaft, a worm wheel carried by the shaft and meshing with said worm to be driven thereby, a cam carried by said shaft, means controlled by the cam for feeding the wire to the frame and shifting it endwise of the frame to form layers thereon, a worm on said cam shaft, a second shaft, a worm wheel on said second shaft and meshing with the worm on the cam shaft, and means adjustably controlled by said second shaft for stopping the operation of the winding spindle after a determined number of rotations.

4. In a winding machine, a rotatable winding spindle, means for mounting on the spindle a frame to be wound, means for feeding a wire to the frame in uniform layers, a shaft, means for driving the shaft concomitantly with and at a given ratio to the spindle, a measuring cam frictionally mounted on said shaft for normal rotation therewith but angularly adjustable thereon, a stop member carried by the measuring cam, an adjustable stop with which the stop member cooperates for variably limiting angular adjustment of the measuring cam to determine its starting position, and means controlled by the measuring cam for stopping the spindle after the measuring cam has been shifted by its shaft a predetermined extent.

5. In a winding machine, a rotatable winding spindle, means for mounting on the spindle a frame to be wound, means for feeding a wire to the frame in uniform layers, a shaft, means for driving the shaft concomitantly with and at a given ratio to the spindle, a measuring cam frictionally mounted on said shaft for normal rotation therewith but angularly adjustable thereon, a stop member carried by the measuring cam and adjustable angularly thereon, an adjustable stop with which the stop member cooperates for variably limiting angular adjustment of the measuring cam to determine its starting position, and means controlled by the measuring cam for stopping the spindle after the measuring cam has been shifted by its shaft a predetermined extent.

6. In a winding machine, a rotatable winding spindle, means for mounting on the spindle a frame to be wound, a rotatable driving spindle aligned end for end with said winding spindle, said spindles at their abutting ends having cooperating coupling devices, said driving spindle being slidable endwise to cause a coupling or uncoupling of the spindles, a spring normally urging said driving spindle into coupled relation with the winding spindle, a measuring cam having a notch therein, means for operating the measuring cam concomitantly with and at a given ratio the operation of the winding spindle, a lever opposing endwise movement of the driving spindle into coupled relation with the winding spindle and having a portion bearing upon said measuring cam within the path of travel of the notch thereof, a spring pressing the lever against the cam whereby when the notch of the measuring cam moves adjacent the portion of the lever bearing thereon, the second spring will press the lever into the notch and shift the driving spindle endwise against the action of the first spring to uncouple said spindles.

7. In a winding machine, a rotatable winding spindle, means for mounting on the spindle a frame to be wound, a rotatable driving spindle aligned end for end with said winding spindle, said spindles at their abutting ends having cooperating coupling devices, said driving spindle being slidable endwise to cause a coupling or uncoupling of the spindles, a spring normally urging said driving spindle into coupled relation with the winding spindle, a shaft geared to the winding spindle, a measuring cam mounted on said shaft and frictionally adjustable thereon to various angular positions, said measuring cam having an abutment and a notch in its surface, a stop against which the abutment may be brought for a starting position when the cam is adjusted upon the shaft in a direction reverse to that in which it moves during a winding operation, a lever bearing against the driving spindle in a direction to oppose the action of the spring, said lever having a portion riding on said cam which holds the lever away from the driving spindle to permit movement of the latter into coupled engagement with the winding spindle, and a second spring pressing the lever against the cam and into the notch thereof, when the cam moves in a winding direction from the starting position into a position in which the notch is adjacent to the part of the lever bearing thereon, said lever when moved into said notch acting upon the driving spindle to uncouple it from the winding spindle and against the action of the first spring.

8. In a winding machine, a rotatable winding spindle, means for mounting on the spindle a frame to be wound, a rotatable driving spindle aligned end for end with said winding spindle, said spindles at their abutting ends having cooperating coupling devices, said driving spindle being slidable endwise to cause a coupling or uncoupling of the spindles, a spring normally urging said driving spindle into coupled relation with the winding spindle, a shaft geared to the winding spindle, a measuring cam mounted on said shaft and frictionally adjustable thereon to various angular positions, said measuring cam having an abutment and a notch in its surface, a stop against which the abutment may be brought for a starting position when the cam is adjusted upon the shaft in a direction reverse to that in which it moves during a winding operation, a lever bearing against the driving spindle in a direction to oppose the action of the spring, said lever having a portion riding on said cam which holds the lever away from the driving spindle to permit movement of the latter into coupled engagement with the winding spindle, and a second spring pressing the lever against the cam and into the notch thereof, when the cam moves in a winding direction from the starting position into a position in which the notch is adjacent to the part of the lever bearing thereon, said lever when moved into said notch acting upon the driving spindle to uncouple it from the winding spindle and against the action of the first spring, said abutment being adjustable upon the cam peripherally thereof and relatively to the notch therein whereby the extent of the winding movement before the spindles are uncoupled may be varied.

9. In a winding machine, a rotatable winding spindle, driving means, a clutch device between it and said spindle, a spring device normally urging said clutch device into coupled relation with said spindle, a shaft geared to the winding spindle, a measuring cam mounted on said shaft and frictionally adjustable thereon to various angular positions relatively to the direction of its rotation, said measuring cam having an abutment and a notch in its surface, a stop against which the abutment may be brought for a starting position when the cam is adjusted upon the shaft in a direction reverse to that in which it moves during a winding operation, a lever opposing the action of the clutch device under the action of the spring device, said lever having a portion riding against the cam, which cam normally holds the lever from operating the clutch device and permits movement of the latter into coupled relation with said spindle, a spring pressing the lever against the cam and into the notch thereof when the cam moves in a winding direction from the starting position into a position in which the notch is beneath the lever, said spring when operating the lever being sufficiently strong to overcome said spring device, the movement of the lever by said spring serving to operate the clutch device and uncouple the driving means and spindle.

10. The machine substantially as set forth in claim 9 in which the abutment is adjustable upon the cam in a peripheral direction and relatively to the notch whereby the extent of the winding movement required before the clutch device will be uncoupled from said spindle, may be varied.

In witness whereof I hereunto subscribe my signature.

HENRY KOCH.